United States Patent [19]

Mizuno et al.

[11] Patent Number: 4,731,288

[45] Date of Patent: Mar. 15, 1988

[54] VINYLIDENE FLUORIDE RESIN FILM AND METALLIZED FILM THEREOF

[75] Inventors: Toshiya Mizuno; Yoshikichi Teramoto; Naohiro Murayama, all of Iwaki, Japan

[73] Assignee: Kureha Kagaku Kogyo Kabushiki Kaisha, Tokyo, Japan

[21] Appl. No.: 716,461

[22] Filed: Mar. 27, 1985

[30] Foreign Application Priority Data

Mar. 31, 1984 [JP] Japan ................... 59-63495

[51] Int. Cl.⁴ ..................... C08F 14/22; B32B 27/06
[52] U.S. Cl. .................... 428/333; 428/421; 428/461; 526/250; 526/255; 264/565; 264/290.2; 264/331.14
[58] Field of Search ............ 264/210.1, 565, 290.2, 264/331.14; 526/255, 250; 428/421, 422, 333

[56] References Cited

U.S. PATENT DOCUMENTS

| | | | |
|---|---|---|---|
| 3,707,592 | 12/1972 | Ishii et al. | 526/255 X |
| 3,925,339 | 12/1975 | Ishii et al. | 526/255 X |
| 3,931,446 | 1/1976 | Murayama et al. | 428/421 |
| 4,290,983 | 9/1981 | Sasaki et al. | 264/290.2 X |
| 4,298,719 | 11/1981 | Mizuno et al. | 526/255 |
| 4,546,158 | 10/1985 | Mizuno et al. | 526/255 |

FOREIGN PATENT DOCUMENTS

| | | | |
|---|---|---|---|
| 0036757 | 9/1981 | European Pat. Off. | 264/290.2 |
| 2095166 | 9/1982 | United Kingdom | 526/255 |

*Primary Examiner*—Edward J. Smith
*Assistant Examiner*—F. M. Teskin
*Attorney, Agent, or Firm*—Wenderoth, Lind & Ponack

[57] ABSTRACT

A vinylidene fluoride resin film having (1) a crystal melting point of 182° C. or higher as measured by differential scanning calorimeter in nitrogen atmosphere at a temperature elevation speed of 10° C./min; (2) a diffraction point corresponding to (1 1 $\zeta$) of the $\alpha$-phase crystal in the wide angle X-ray diffraction photograph; and (3) an orientation degree of the crystal of 0.85 or more when measured under irradiation of X-ray incident vertically on a major surface of the film. The vinylidene fluoride resin film is obtained by inflation accompanying melt necking stretching. The film has improved mechanical properties and heat-stability and is also adapted for use as a base film of a metallized film.

8 Claims, 7 Drawing Figures

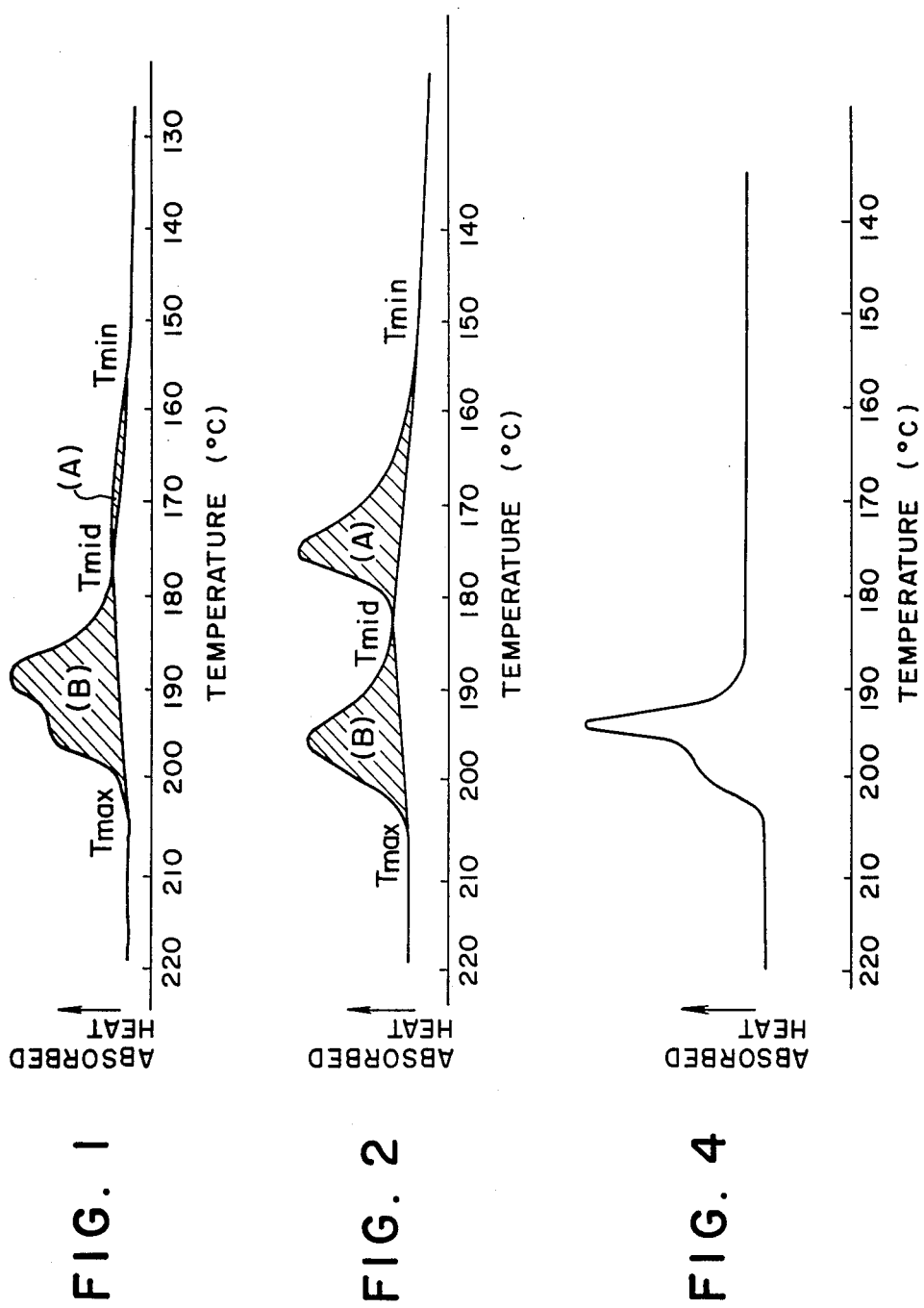

VINYLIDENE FLUORIDE RESIN FILM AND METALLIZED FILM THEREOF

BACKGROUND OF THE INVENTION

This invention relates to a vinylidene fluoride resin film with a constant film thickness and excellent in both tearing strength and Young's modulus, a process for production thereof and a metallized film of the film.

A vinylidene fluoride resin film excellent in Young's modulus is disclosed in Japanese Laid-Open Patent Application No. 148628/1982 relating to an invention achieved by one of the present inventors. This film is obtained by melt extrusion of a vinylidene fluoride resin at a high draft ratio and cooling the extruded film on a cooling roller, and the distance between the die outlet and the cooling roller is thereby required to be made as short as 10 cm or less. The film obtained by this method is inevitably subject to shrinkage in width to some extent and therefore the physical properties differ between the both end portions and the central portion of the film in the plane which is vertical to the draft direction and parallel to the principal plane. For this reason, it has been necessary to provide only the portion uniform in physical properties by removing both ends by slitting. Besides, the film thus obtained has also the drawback of being readily torn along the drafted direction. More specifically, its tear strength is only 2 to 8 g.cm/cm as measured according to JIS-P8116 by means of a light load tear strength tester produced by Toyo Seiki K.K.

Further, Japanese Patent Application No. 173634/1982 (later laid open as Japanese Laid-Open Patent Application No. 62115/1984) discloses a film of a vinylidene fluoride polymer consisting mainly of vinylidene fluoride, having a crystalline structure of mainly an α-phase, having an orientation degree $\pi$ of the molecular axis in the crystalline region of 0.8–1.0 in a direction parallel with a film surface and being free of heat shrinkage due to heating from room temperature to the neighborhood of the melting point. The film developed by the research group of the present inventors is almost satisfactory in regard to a tear strength but only has a Young's modulus of 300 kg/mm² at the most.

SUMMARY OF THE INVENTION

An object of the present invention, in view of the state of the art as described above, is to provide a vinylidene fluoride resin film with a constant film thickness and excellent in both tear strength and Young's modulus, a process for production thereof and a metallized film obtained therefrom.

The present invention is based on the discovery that a vinylidene fluoride resin excellent in various characteristics as mentioned above can be obtained when it has a diffraction point corresponding to (1 1 $\bar{\zeta}$) of the α-phase crystal in a wide angle X-ray diffraction photograph, as different from the films obtained in the above-mentioned Japanese Laid-Open Patent Application No. 148628/1982 and Japanese Patent Application No. 173634/1982, and also has a higher crystal melting point as well as a high crystal orientation, and also that it can be suitably used for giving a metallized film.

More specifically, the vinylidene fluoride resin film of the present invention is characterized by having the characteristics (1) to (3) shown below:

(1) a crystal melting point of 182° C. or higher as measured by a differential scanning calorimeter in nitrogen atmosphere at a temperature elevation speed of 10°/min;

(2) a diffraction point corresponding to (1 1 $\bar{\zeta}$) of the α-phase crystal in a wide angle X-ray diffraction photograph;

(3) an orientation degree of the crystal of 0.85 or more when measured under the irradiation of X-rays vertically on a major surface of the film.

The process for producing the vinylidene fluoride resin film of the present invention produces film having the above characteristics. More particularly, this method comprises melt extruding a vinylidene fluoride resin through a circular die at a temperature not higher than the decomposition temperature of the resin without causing melt fracture, and inflating the extruded film at a blow-up ratio of 1.05 or more which is chosen so as to obtain a stable bubble while permitting the extruded film to undergo melt necking stretching.

Further, the metallized film of the present invention comprises the above vinylidene fluoride resin film of the present invention and a metal film coated on at least one of the main surfaces of the vinylidene fluoride resin film.

These and other objects, features and advantages of the present invention will become more apparent upon a consideration of the following description of the present invention concluding with working examples thereof taken in conjunction with the accompanying drawings.

BRIEF DESCRIPTION OF THE DRAWINGS

FIGS. 1, 2 and 4 respectively show an example of melting curve by a differential scanning calorimeter;

DETAILED DESCRIPTION OF THE INVENTION

Figure 3A:
FIGS. 3A and 5A respectively show a wide angle X-ray diffraction photograph.

The vinylidene fluoride resin as mentioned in the present invention refers to a vinylidene fluoride homopolymer, as a matter of course, and also copolymers containing 70 mole % or more of vinylidene fluoride as constituent units together with at least one monomer copolymerizable therewith or compositions containing 70% by weight or more of at least one of these polymers. Examples of the monomer copolymerizable with vinylidene fluoride include ethylene, propylene, isobutylene, vinyl fluoride, trifluoroethylene, tetrafluoroethylene, trifluoromonochloroethylene, and hexafluoropropylene. The constituents for the composition are not particularly limited and may be inclusive of different kinds of polymers, organic or inorganic additives, etc. Typical examples of the additives may include aliphatic polyester plasticizers, flavanthrone which is a pigment, potassium chloride powder, titanium oxide powder, dibutylphthalate, etc.

The film of the present invention is characterized, first of all, by having a crystal melting point of 182° C. or higher as measured by a differential scanning calorimeter (DSC) in a nitrogen atmosphere at a temperature elevation speed of 10° C./min. Here, the crystal melting point refers to a temperature giving a peak of heat absorption due to melting or fusion. Since the Young's modulus becomes greater as the proportion of the heat absorption area based on the melting heat absorption peak of 182° C. or higher occupied in the total heat absorption peak in the DSC chart is greater, this proportion should preferably be 5% or more, more preferably 25% or more, particularly preferably 50% or more. Also, if the proportion of the heat absorption area is increased to a substantial value, thermal stability can also be increased. The substantial value mentioned here means 80% or more, preferably 85% or more, particularly 90% or more.

Also, for the same reason, the film should preferably have a crystal melting point at a higher temperature, preferably 185° C. or higher, further preferably 190° C. or higher. Besides, in the heat absorption area in the DSC chart, the proportion occupied by the heat absorption area based on the melting heat absorption peak of these temperatures or higher should preferably be as high as possible, especially as explained above with reference to the case of 182° C. or higher.

The base line for calculating the heat absorption area in the DSC measurement chart is determined as follows.

First, a sample to be measured is elevated to 220° C. under the conditions as already described to determine the melting curve of the sample. Thereafter, after being maintained at 220° C. for 30 seconds, the sample is lowered in temperature at a rate of 10° C./min. to be crystallized and cooled to room temperature. The thus obtained melted and recrystallized product is again elevated in temperature under the same conditions to determine the crystal melting curve. The end point of crystal melting of the melting curve obtained, namely the point when the heat generation peak has completed ($T_{mid}$), is determined (see FIG. 1 and FIG. 2).

The melting peak in the melting curve of the measured sample is divided at this point $T_{mid}$, while the both ends on the maximum temperature side and the minimum temperature free of any heat absorption or evolution in the melting curve are respectively connected to the point $T_{mid}$ to define a baseline. The positions of both ends of no heat absorption or evolution are determined by overlapping the DSC measurement chart obtained under the state where no sample is contained, following otherwise entirely the same conditions.

Another specific feature of the film of the present invention is that it has a diffraction point corresponding to (1 1 $\zeta$) of the $\alpha$-phase crystal in the wide angle X-ray diffraction photograph.

Figure 3B:
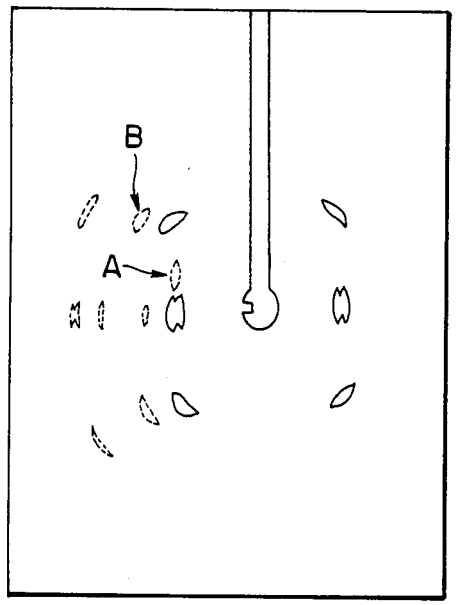
FIGS. 3B and 5B are sketches for illustration of pertinent portions of FIGS. 3A and 5A, respectively.

FIG. 3A is an X-ray diffraction photograph of the vinylidene fluoride resin film obtained in Example 1 as hereinafter described, and FIG. 3B is a sketch for illustration of the pertinent portion thereof. The diffraction point recognized at the tip of the arrowhead A as shown in FIG. 3B (shown by broken line; see the corresponding portion in FIG. 3A) is the diffraction point in question of (1 1 $\zeta$) of the $\alpha$-phase crystal. Presence of this diffraction point of (1 1 $\zeta$) indicates existence of kink band within the $\alpha$-phase crystal. No such (1 1 $\zeta$) has been recognized in the film as disclosed in Japanese Laid-Open Patent Application No. 148628/1982 or Japanese Patent Application No. 173634/1982, and such a diffraction point was previously reported for a product obtained by subjecting a cold stretched product of a vinylidene fluoride resin to heat treatment at 175° C. for 10 days or longer (Takahashi et al, Preprints for Polymer Forum, p. 2015, vol. 29, No. 9, 1980). However, such a cold stretched product has no crystal melting of 182° C. or higher, and nor does exhibit a Young's modulus of 350 kg/mm² or more.

The diffraction point corresponding to (1 1 $\zeta$) of the $\alpha$-phase crystal is recognized not only for the $\alpha$-phase crystal, but also for the $\gamma$-phase crystal. Rather, for the $\gamma$-phase crystal, the diffraction point can be more clearly recognized in spots as contrasted to the $\alpha$-phase crystal in which it is recognized vaguely. The wording "a diffraction point corresponding to (1 1 $\zeta$) of the $\alpha$-phase crystal" as herein mentioned is used to mean that such a diffraction point due to the $\gamma$-phase crystal is also included.

Four kinds of crystal structures, namely $\alpha$-phase crystal structure, $\beta$-phase crystal structure, $\gamma$-phase crystal structure and polar $\alpha$-phase crystal structure have been known as the crystal structures of polyvinylidene fluoride. Of these, the $\alpha$-phase has the conformation of its molecular chain of trans (T)-gauche (G)-trans (T)-gauche dash (G') with a 2/1 helix structure, while the $\beta$-phase is all trans with a planar zigzag structure. The polar $\alpha$-phase is a structure obtained by treatment of the $\alpha$-phase crystal under high electrical field, and it is a special class of $\alpha$-phase crystal structure in which the unit lattice dipoles are oriented all in a certain direction, as disclosed in, for example, Journal of Applied Physics 49 (10) by G. T. Davis et al. In contrast, the $\gamma$-phase crystal structure is a structure comprising a conformation of $GT_3G'T_3$ as shown in the report by Takahashi et al, supra. This crystal also has a structure in which dipoles are oriented in a certain direction within the unit lattices, but as different from the polar $\alpha$-phase crystal structure, it has a structure enriched in trans form.

In the film of the present invention, it is particularly preferred that the crystal structure consists of only the $\gamma$-phase structure, but a structure containing small amounts of other crystal structures or a structure consisting primarily of the $\alpha$-phase structure and having a ratio of absorption at 510 cm$^{-1}$ which is the absorption band based on the $\beta$-crystal relative to absorption at 530 cm$^{-1}$ which is the absorption band based on the $\alpha$-crystal of 0.3 or less is also preferred.

The film of the present invention is also required to have an orientation degree $\pi$ of 0.85 or more when measured under irradiation of an X-ray vertically incident on a major surface (i.e., one of the two major surfaces) of the film. The orientation degree ($\pi$) of the film as herein mentioned is determined by determining the half-value width of the diffraction arc of interest by use of a sample stand according to the X-ray diffraction method and through a calculation from the half-value width. More specifically, a sample is set on the sample stand so that X-ray is vertically incident on the surface of the film to be measured, and the half-value width ($\Delta\theta$) of the intensity distribution in the circumferential direction of the diffraction arc (1 1 0) obtained according to the transmission method of the $\alpha$-phase crystal of polyvinylidene fluoride is measured. The orientation degree ($\pi$) is calculated from this value ($\Delta\theta$) as follows:

$$\pi = (180 - \Delta\theta)/180.$$

Since the Young's modulus of the film is greater as this orientation degree is greater, it should preferably be 0.9 or more.

The film of the present invention as described above can be obtained by, for example, melt extruding a vinylidene fluoride resin through a circular die at a temperature not higher than the decomposition temperature of the resin without causing melt fracture, and permitting the extruded film to undergo melt necking stretching in the process of carrying out inflation with a blow-up ratio of 1.05 or more which is chosen so as to obtain a stable bubble.

The "melt necking stretching" as herein used is designated for the first time in the present invention, and it refers to a phenomenon in the process of drawing at a high draft ratio a melt extruded resin to solidify the resin that a constriction is formed at a position of generally 2 cm to 30 cm downstream from the die outlet, where the maximum deformation of extremely great speed occurs. As a phenomenon similar to this phenomenon, the necking stretching has been known. However, while the necking stretching occurs when, for example, a non-oriented resin once cooled and solidified is stretched at a temperature lower than the crystal melting point, the melt necking stretching is different therefrom in that it occurs during the course of solidification from the molten state. Further, the necking stretching is effected at a stretching ratio of 7 at the highest in the case of a vinylidene fluoride homopolymer at a stretching temperature of from around room temperature to the vicinity of melting point, and the stretching is close to zero when the stretching temperature approaches the melting point. In contrast, the melt necking stretching is also different from the necking stretching in that the stretching ratio is at least some tens in the case of a vinylidene fluoride homopolymer. It has not been recognized with respect to not only vinylidene fluoride resins but also other resins that such melt necking stretching will clearly occur in the process of drawing melt extruded resin.

By occurrence of such melt necking stretching, inflation of a vinylidene fluoride resin film having a uniform film thickness and excellent in both Young's modulus and tear strength has become possible. Hitherto, because a vinylidene fluoride resin is poor in flexural strength under molten state, when the resin is extruded through a circular die and subjected to inflation, it has been difficult to maintain stable bubble during the inflation, whereby the film obtained under such a state can hardly have a constant film thickness in both lengthwise and circumferential directions. Furthermore, the Young's modulus of the film thus obtained has been as low as 250 kg/mm$^2$ or less.

In order to cause the above mentioned melt necking stretching, it is not suitable that the polymerization degree of at least the principal constituent polymer of the vinylidene fluoride resin is too large or too small. That is, if the polymerization degree is too large, slippage between the molecules does not readily occur, whereby melt fracture may be generated during extrusion and stable extrusion cannot be effected easily. Even if extrusion is effected with a small shearing speed within such an extent that no melt fracture occurs, the tube will be severed during drawing due to poor slippage between the molecules, so that film formation becomes actually very difficult. On the other hand, if the polymerization degree is too small, the resin becomes excessively fluid, whereby orientation cannot be effected. Accordingly, at least the principal resin constituting the vinylidene fluoride resin to be employed should have an inherent viscosity of the solution when measured in a 0.4 g/dl solution in dimethylformamide at 30° C. generally within the range of from 0.8 to 1.8 dl/g, preferably from 1.0 to 1.6 dl/g, more preferably from 1.1 to 1.4 dl/g.

The above mentioned melt necking stretching can be effectively accomplished by increasing the product of the draft ratio and the blow-up ratio. Here, the draft ratio ($R_1$) refers to the ratio of the take-up speed (R) at the take-up roll relative to the flow-out speed ($R_0$) of the resin at the die outlet (i.e. $R_1 = R/R_0$). The blow-up ratio ($B_1$) refers to the ratio of the folded width (W) of the tubular film taken up relative to a half of the circumference of the die lip, namely $\pi D/2$ wherein D is the diameter of the die lip, (i.e. $B_1 = 2W/\pi D$). While the blow-up ratio has an upper limit as hereinafter described, there is no upper limit of the draft ratio, so long as inflation is possible. However, in most cases, it will be only subject to restrictions due to the size of the space where inflation is to be performed. In view of such upper limits, the product of the draft ratio and the blow-up ratio should preferably be 50 or more, more preferably 100 or more, further preferably 300 or more.

In most cases, for effectively causing melt necking stretching, inflation is conducted in such a manner that the film thickness of 0.5 to 15 microns is attained thereby. Further, for giving a ratio of 80% or more of the heat absorption area based on the melting heat absorption peak of the high melting temperature crystal of 190° C. or higher, the inflation is conducted so as to make the film thickness 10 microns or less. This is because, if the film thickness is too thick, the resin cannot be cooled easily, whereby orientation relaxation cannot be suppressed. For effectively causing melt necking stretching in such a manner, it is necessary to cool the film while performing inflation in addition to selection of the film thickness. Cooling, preferably forcible cooling, may be effected according to known methods such as the method in which cooling wind is blown against the film through an air-ring equipped in the vicinity of the die outlet, the method in which the film is dipped in a coolant, typically water, etc., or equivalent methods.

The upper limit of the resin temperature when the vinylidene fluoride resin is melt extruded through a circular die is the decomposition temperature of the resin. The decomposition temperature differs depending primarily on the resin employed, the polymerization conditions, the composition, the molding residence time, etc., and therefore it is determined individually. On the other hand, the lower limit of the resin temperature is determined so as not to cause melt fracture. The lower temperature limit cannot be constant, because melt fracture will be affected by the melt viscosity and the flow velocity of the resin. For example, with respect to a vinylidene homopolymer obtained through suspension polymerization, although different depending on the flow velocity, the appropriate resin temperature is generally 190° to 210° C. if the polymerization degree is about 850, generally 200° to 240° C. if the polymerization degree is about 1000, generally 230° to 270° C. if the polymerization degree is about 1300 and, further, generally 250° to 280° C. if the polymerization degree is about 1450. Even in these cases, by addition of a plasticizer or a lubricant, extrusion may be possible at a lower temperature by several to some tens °C. than the above temperature conditions.

If the lip clearance of the circular die is too small, the flow velocity will become greater, whereby melt fracture will occur unless the extruded amount is made smaller. Thus, the lower limit is generally 0.5 mm, and more frequently 1.0 mm. On the contrary, if the lip clearance is too large, the draft ratio, etc., must be made relatively greater, in order to perform inflation while causing the melt necking stretching, whereby the film production becomes difficult. Thus, a clearance of 5.0 mm or less is generally employed, and a clearance of 4.0 mm or less is frequently used.

For the extruded tube, a blow-up ratio is chosen so as to give a stable bubble and inflation is performed with its ratio being about 1.05 or more. For obtaining a stable bubble, the upper limit of the blow-up ratio is generally about 4.0, preferably about 3.0, more preferably 2.0. On the other hand, if the blow-up ratio is too small, only slight improvement in tear strength can be effected and hence the lower limit should at least be about 1.05, preferably about 1.2, more preferably about 1.5.

As the blow-up ratio is lowered, it becomes more difficult to discern the existence of the vague diffraction spot (1 1 $\zeta$) in the wide angle X-ray diffraction photograph. Also, as the intensity of the diffraction spot of (1 1 $\zeta$) of the $\alpha$-phase crystal is stronger, the film will more readily become a film of the $\gamma$-phase crystal structure by the heat treatment as hereinafter described. For these reasons, a greater blow-up ratio within the above range is more preferred.

The film thus obtained exhibits the $\alpha$-phase structure. This is unique in view of the fact that the conventional necking stretching resulted in the $\beta$-phase structure. Also, as contrasted to the inflation film of the prior art having a Young's modulus of 250 kg/mm$^2$ at the highest and a tear strength of 2–8 g.cm/cm, the film thus obtained has a Young's modulus of 300 kg/mm$^2$ or more, even 350 kg/mm$^2$ or more if preferable conditions are selected, and a tear strength which is at least 10 g.cm/cm or more, generally 15 kg.cm/cm or more, even 20 kg.cm/cm or more if preferable conditions are selected.

Such a film can be subjected to a heat treatment at a temperature of 150° C. or higher to increase its thermal stability. When the film has a single crystal melting point, the heat treatment can be conducted at a lower temperature than the crystal melting point to give higher thermal stability. On the other hand, when the film has a plurality of crytal melting points, the heat treatment can be conducted at a temperature as high as possible for a long time, provided that the temperature is lower than the higher crystal melting point, to give higher thermal stability.

The film according to the present invention has a high crystal melting point, and a film having a high melting point around 190° C., for example, can easily be obtained. Therefore, if heat treatment is applied to the film at around 180° C., high thermal stability with no heat absorption or evolution at all for a temperature of about 180° C. can easily be obtained.

The reason why such a high thermal stability with no heat balance even to a temperature higher by about 5° C. than the heat treatment temperature can be obtained may be attributable to incorporation of the crystals having melting points on the lower temperature side into the crystals existing on the higher temperature side as the result of the heat treatment for a long time.

In practicing the heat treatment, it is not necessarily required to carry out the heat treatment under a constant length state, but it is usually preferred to carry out the heat treatment under a constant length state or within the range of from 5% tension to 10% relaxation.

The heat treatment can be conducted as longer as possible within the range of not causing pyrolysis of the film in order to give a complete $\gamma$-phase crystal structure but, if it is too long the film may undesirably be colored and deteriorated through oxidative decomposition, etc., or further darkened to become brittle. On the other hand, if it is too short, the structure remains in the $\alpha$-phase crystal structure containing kink band and cannot reach the $\gamma$-phase crystal structure. For these reasons, the heat treatment time may preferably be 2 hours or longer and within 30 days. More preferably, it should be from 5 hours to 10 days, most preferably from 10 hours to 5 days.

The film subjected to such heat treatment has a crystal structure of the $\gamma$-phase. Also, Young's modulus and tear strength can be increased further than before the heat treatment, and Young's modulus of 350 kg/mm$^2$ or higher and tear strength of 12 g.cm/cm can be imparted to the film. The film is also excellent in heat resistance along with these properties, and therefore it can be suitably subjected to vapor deposition or sputtering to form a metal film on at least one surface of the film. The metallized film thus formed can suitably be used as, for example, a capacitor film.

The present invention is further described by referring to the following Examples.

EXAMPLE 1

Pellets of a vinylidene fluoride homopolymer with a number average polymerization degree of 1300 and an inherent viscosity of 1.3 dl/g as measured in a 0.4 g/dl solution in dimethylformamide at 30° C. prepared by suspension polymerization at 25° C., were melt-extruded upwardly by means of an extruder with a cylinder diameter of 35 mm and L/D=26 through a circular die with a lip diameter of 50 mm and a lip clearance of 3 mm with an extrusion rate of 65 g/min., namely at $R_0=8.1$ cm/min. at a resin temperature of 260° C., and the extruded tube was inflated at a blow-up ratio of about 2 while blowing air for cooling at about 0.01 m$^3$/sec. from the air-ring disposed about 5 cm above the die. When the take-up speed (R) was 47 m/min., namely when the draft ratio was 580, the bubble was stabilized. The film taken up had a thickness of about 2.5 microns, and the melting curve obtained by DSC (produced by Shimazu Seisakusho K.K.) when the temperature was elevated at a rate of 10° C./min. in nitrogen atmosphere is shown in FIG. 1. The X-ray diffraction photograph of this film is shown in FIG. 3A, and the sketch for illustration of its pertinent portion in FIG. 3B. As previously mentioned, the diffraction spot (1 1 $\zeta$) is one indicated ahead of the arrowhead A in FIG. 3B. Other physical properties are shown in table 1 below. Tear strength was measured according to a method based on JIS-P8116 by means of a light load tear strength tester (produced by Toyo Seiki Seisakusho K.K.). The difference from JIS-P8116 was that one sheet was used instead of 6 laminated sheets.

EXAMPLE 2

Figure 5A:
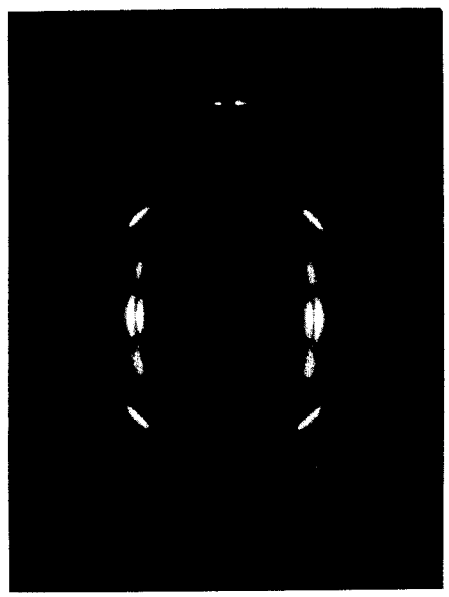
Figure 5B:
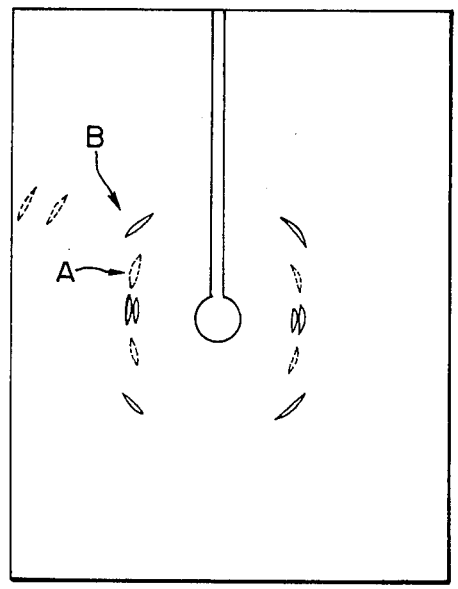

The film obtained in Example 1 was subjected to a heat treatment at 180° C. in an air oven for 40 hours. The heat treatment was carried out with both surfaces of the film being coated with a mold release agent "Diefree" (produced by Daikin Kogyo K.K.) and sandwiched between a pair of micro-finished stainless steel plates, that is, while maintaining the film under a substantially constant length. The melting curve of this film obtained similarly as in Example 1 is shown in FIG. 4. At temperatures lower than 185° C., no heat absorption or evolution is recognized and it can be seen that the film is further excellent in heat resistance when compared with one shown in FIG. 1. Its X-ray diffraction photograph is shown in FIG. 5A and the sketch for illustration of the pertinent portion thereof is shown in FIG. 5B. It can be seen that the diffraction point (ahead of the arrowhead A) corresponding to (1 1 ζ) of the α-phase crystal is enhanced in its intensity as compared with FIG. 3. At the same time, it can also be known that the diffraction spot indicated by the arrowhead B in FIG. 3, which is one of the diffraction spots inherent to the α-phase crystal, is not recognized in FIG. 5. From these facts, it can be understood that the film gave the diffraction pattern of the γ-phase crystal. Other physical properties are shown in Table 1.

EXAMPLES 3 AND 4

Examples 3 and 4 were conducted by repeating Example 1 except for changing the draft ratio to 310 and 450, respectively. The results are shown in Table 1. FIG. 2 is the melting curve of the film of Example 4.

EXAMPLE 5

Example 1 was repeated except that a vinylidene fluoride homopolymer having a number average molecular weight of 1120 and an inherent viscosity of 1.12 dl/g as measured in 0.04 g/dl solution in dimethylformamide at 30° C. prepared by suspension polymerization at 110° C. was employed, the extruded amount was changed to 60 g/min., the blow-up ratio to 2.3 and the draft ratio is 520. As the result, the results shown in the following Table 1 were obtained.

(1) a crystal melting point giving a heat absorption peak of from 182° C. to about 196° C. as measured by a differential scanning calorimeter in a nitrogen atmosphere at a temperature elevation speed of 10° C./min.;

(2) a diffraction point corresponding to (1 1 ζ) of the α-phase crystal at a wide angle X-ray diffraction photograph; and (3) an orientation degree of the crystal of from 0.85 to about 0.94 when measured under irradiation of X-ray incident vertically on a major surface of the film.

2. The vinylidene fluoride resin film according to claim 1, wherein the ratio of absorbance of the film at 510 cm$^{-1}$ to that at 530 cm$^{-1}$ is 0.3 or less.

3. The vinylidene fluoride resin film according to claim 1, wherein the crystal structure of the film is of the γ-phase.

4. The vinylidene fluoride resin film according to claim 1, which comprises vinylidene fluoride homopolymer or a copolymer of vinylidene fluoride and a monomer copolymerizable therewith comprising at least 70 mole % of vinylidene fluoride units.

5. The vinylidene fluoride resin film according to claim 1, which has a proportion of heat absorption area on a chart of the differential scanning calorimeter measurement based on the crystal melting point of 182° C. to about 196° C. of 5% or more.

6. The vinylidene fluoride resin film according to claim 5, wherein the proportion of the heat absorption

TABLE 1

| | Temperature of crystal m.p. of 182° C. or higher (°C.) | Proportion of heat absorption area for crystal m.p. of 182° C. or higher (%) | Orientation degree of crystal | D510 D530 | (1 1 ζ) in wide angle X-ray diffraction | Young's modulus (kg/mm$^2$) | | Tear strength (g · cm/cm) |
|---|---|---|---|---|---|---|---|---|
| | | | | | | Draft direction | Width direction | |
| Example 1 | 188 | 95 | 0.94 | 0.14 | FIG. 3 | 550 | 410 | 17 |
| Example 2 | 193 | 99.9 | 0.92 | — | FIG. 5 | 510 | 410 | 20 |
| Example 3 | 196 | 7 | 0.91 | 0.07 | Weaker in intensity than FIG. 3 | 320 | 380 | 28 |
| Example 4 | 194 | 52 | 0.93 | 0.09 | Weaker in intensity than FIG. 3 | 450 | 430 | 22 |
| Example 5 | 183 | 70 | 0.93 | 0.11 | Similar to FIG. 3 | 330 | 370 | 31 |

What is claimed is:

1. A vinylidene fluoride resin film comprising a homopolymer or copolymer of vinylidene fluoride having an inherent viscosity of 0.8 to 1.8 dl/g as measured in dimethylformamide at a concentration of 0.4 g/dl at 30° C., said vinylidene fluoride resin film having the characteristics (1) to (3) shown below:

area based on the crystal melting point of 182° C. to about 196° C. is 50% or more.

7. The vinylidene fluoride resin film according to claim 1, which has a thickness of from 0.5 to 15 microns.

8. A metallized film, comprising a vinylidene fluoride resin film according to any one of claims 1–4 or 5–7 and a metal film formed on at least one major surface of the vinylidene fluoride resin film.

* * * * *